United States Patent [19]

Bauer et al.

[11] 4,063,832
[45] Dec. 20, 1977

[54] PARALLEL LINKAGE WITH PIVOTED TRANSLATING LINK

[75] Inventors: James J. Bauer, Lisbon; Lonnie D. Hoechst, Gwinner, both of N. Dak.

[73] Assignee: Clark Equipment Company, Buchanan, Mich.

[21] Appl. No.: 635,537

[22] Filed: Nov. 26, 1975

[51] Int. Cl.² .................................... F16C 11/00
[52] U.S. Cl. ................................ 403/54; 403/59; 403/119
[58] Field of Search .............. 403/53, 121, 55, 59, 403/62, 63, 161, 119, 379, 157; 214/138, 140; 74/99 R, 103, 105, 534, 541

[56] References Cited

U.S. PATENT DOCUMENTS 2,967,726  1/1961  Weston ............................. 403/157

FOREIGN PATENT DOCUMENTS 460,411  1/1937  United Kingdom ............... 403/62

Primary Examiner—Wayne L. Shedd
Attorney, Agent, or Firm—Harry G. Thibault

[57] ABSTRACT

A linkage, especially for the pedals of a skid-steered tractor vehicle for operating the boom arms and attachment carrier, which requires no machining or threaded couplings. The arrangement includes links made of flat bar stock. Pivotal connections between adjacent links are made by punched holes, pins and side connectors. Adjustment for linear travel is at the pedal or valve rather than in the linkage itself. Crossover in the linkage path is by a bridging link having an open slot with curved sides rocking on a flat sided pin whereby movement is transmitted laterally.

4 Claims, 7 Drawing Figures

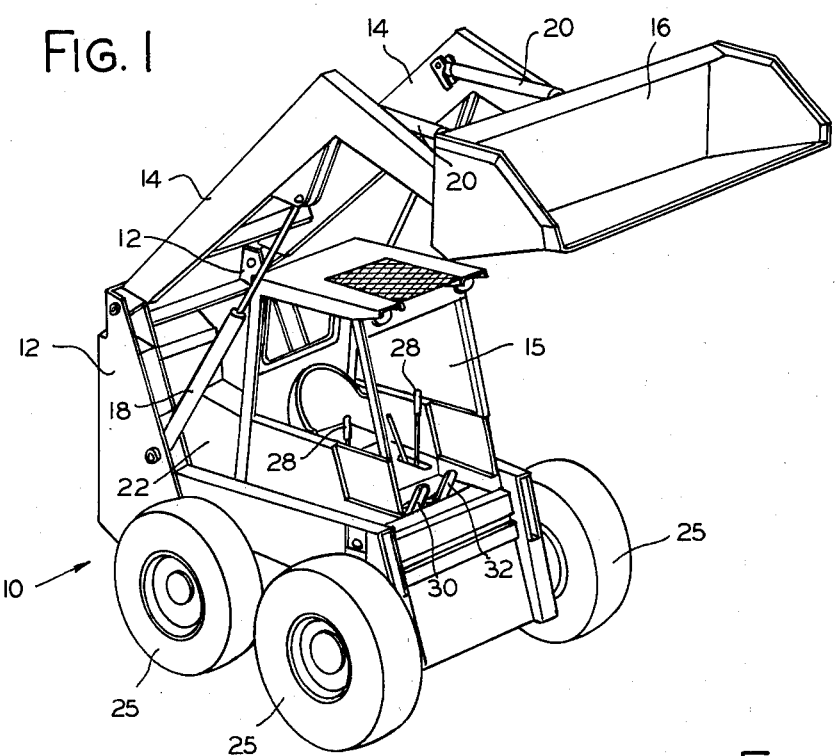
FIG. 1
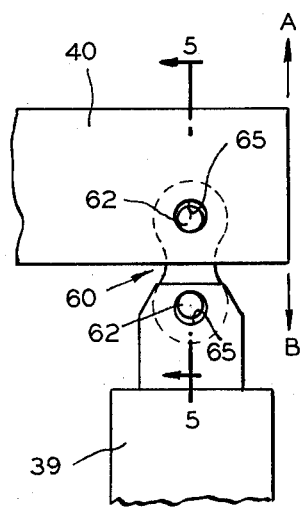
FIG. 4
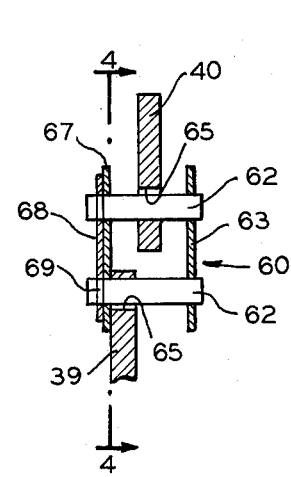
FIG. 5
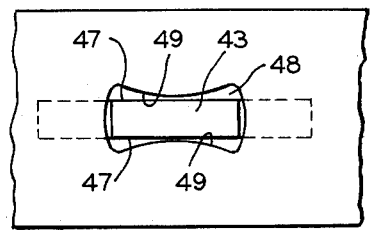
FIG. 7
FIG. 6

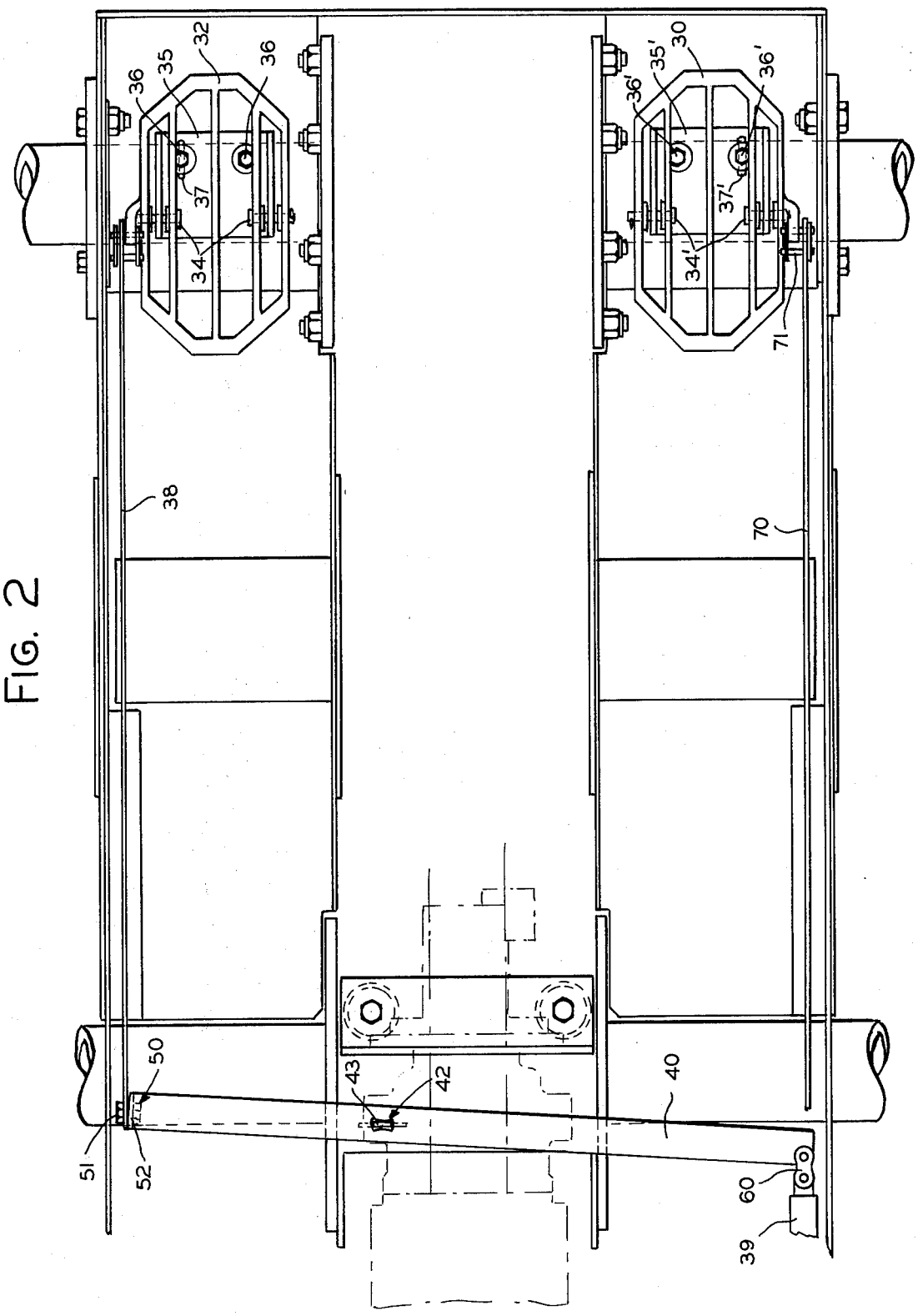

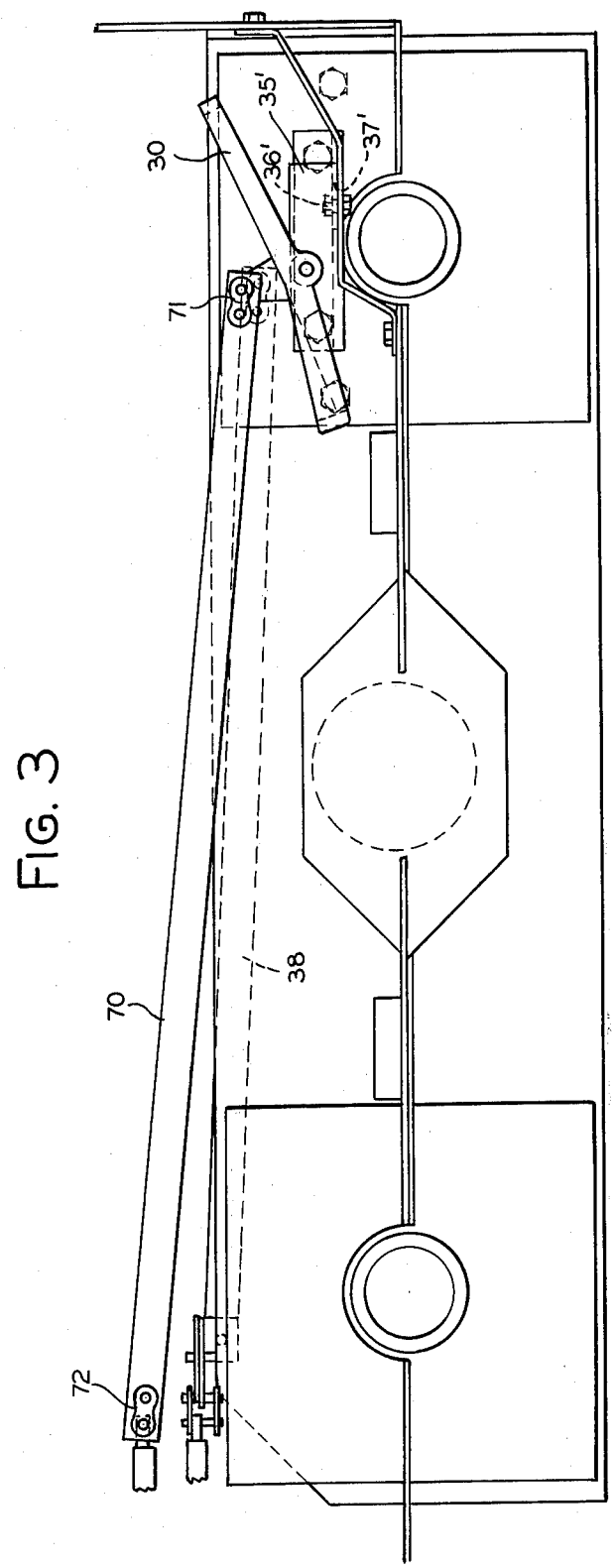

PARALLEL LINKAGE WITH PIVOTED TRANSLATING LINK

BACKGROUND OF THE INVENTION

The invention pertains to the art of motion transmitting mechanisms, machine elements, and linkages.

1. Field of the Invention

More particularly a linkage is required for operating a control valve of an hydraulic system. For a vehicle such as a skid-steered tractor vehicle having boom arms which can be raised and lowered and an attachment carrier pivoted on the front of the boom arms, this involves a control valve for hydraulic cylinders both to raise and lower the boom arms and for pivoting the attachment carrier on which is usually mounted a bucket, backoe or the like.

2. Description of the Prior Art

A skid-steered tractor vehicle of the type referred to is disclosed in U.S. Pat. No. 3,866,700 issued Feb. 18, 1975 to the inventor; James J. Bauer, and is assigned to the assignee of the present invention. A variety of linkage rods, machined parts and threaded connectors are used for assembling the various components of the linkage and to provide adjustment. For convenience reference is made to the aforementioned patent and particularly to FIG. 20, Columns 12, 13 and 14; lines 53-68; 1-68 and 1-12, respectively, describing the control valve and hydraulic system for such a vehicle.

Linkages for controlling the boom arms and attachment carrier of such a vehicle have, heretofore, used threaded parts which are relatively expensive. Repairs are time consuming. Also visual inspection does not detect a malfunction or out of adjustment condition.

SUMMARY OF THE INVENTION

A linkage is provided for transmitting motion between a motion causing device, such as a rockable foot pedal, and a motion responsive device, such as an hydraulic control valve.

In the preferred embodiment of the invention, the link members are made of flat bar stock. The bars are punched with holes at the ends. To facilitate punching, the diameter of the hole exceeds the thickness of the bar. A pair of side connectors of thinner gauged material is punched with smaller holes. The side connectors are placed, one on each side of the bar links, over the holes in the two links brought together to be joined. A pair of pins connect the two side connectors through the holes in the bar links.

In making a crossover connection, a bridging link is used. This is needed, for example, where the left foot pedal operates a valve on the right side of the machine. The linkage path is transferred laterally, or to the opposite side of the machine, by the bridging link. More particularly, the bridging link connects laterally spaced linearly movable link members, one operated by the foot pedal and the other operating the control valve. A connection intermediate the ends of the bridging link provides a fulcrum. An open slot is punched in the link. The slot has curved sides. A pin having flat sides is mounted on a support and receives the slot such that linear motion from one side is transmitted to the other by the bridging link rocking on this antifriction contact.

Adjustment of the linkage is avoided. Rather any adjustment required is made by moving the mounting at either end. In the preferred embodiment a bracket is provided for the pedal. The bracket has a slot and hole attachment to the floor support of the vehicle permitting it to be swiveled about the hole by loosening the slot fastener. This will adjust the pedal position corresponding to the required valve spool displacement.

From the foregoing, it may be seen that one of the advantages of the present invention is that threaded connections and drilled or machined parts, which have heretofore been used in linkage systems, are avoided altogether.

Another advantage is that a major portion of the linkage path is constructed of flat bar stock which is relatively inexpensive and easy to punch.

There is also the advantage that assembly and disassembly is made easier and quicker for faster maintenance or repair.

These and other advantages will be more apparent by referring to the following detailed description of the invention which proceeds with a description of the drawings as follows:

DESCRIPTION OF THE DRAWINGS

FIG. 1 is a front perspective view of a skid-steered tractor vehicle having foot pedals in the operator's compartment for operating the boom arm and bucket cylinders;

FIG. 2 is a plan view showing the pedal linkage of the vehicle in FIG. 1 using a crossover link according to the present invention;

FIG. 3 is a side view showing the pedal linkage of FIG. 2;

FIG. 4 is a fragmentary plan view of one connector taken along line 4—4 of FIG. 5;

FIG. 5 is a fragmentary cross-sectional view through the connector of FIG. 4 taken along line 5—5;

FIG. 6 is a fragmentary side view of the pin and slot connection of the bridging link intermediate its ends; and FIG. 7 is a plan view of the pin and slot connection in FIG. 6.

DESCRIPTION OF A PREFERRED EMBODIMENT

FIG. 1 is a front perspective view of a skid-steered tractor vehicle 10 having a pair of uprights 12 at the rear, a pair of boom arms 14 pivoted to the uprights 12 and extending forwardly along side an operator's compartment 15 mounting an attachment, in this case a bucket 16, on an attachment carrier (not shown) pivoted on the lower ends of the boom arms 14. A pair of hydraulic cylinders 18 mounted between the uprights 12 and boom arms 14 may be extended, as depicted in FIG. 1, for raising the boom arms 14 or retracted for lowering the arms. Other hydraulic cylinders 20 mounted between the arms 14 and the attachment carrier may be operated to pivot the carrier to dump or roll back the bucket 16. The vehicle is powered by an engine 22 mounted toward the rear which drives the wheels 25 on opposite sides of the vehicle in either forward or reverse directions, or at the same or different speeds, as controlled by steering levers 28 which independently control separate transmissions. Thus the wheels 25 are driven independently to steer or maneuver in a manner already known as skid-steering.

The vehicle 10 will include an hydraulic system pressurized by a pump driven off of the engine 22 and controlled by a valve operated from foot pedals 30, 32 in the operator's compartment for extending or retracting the boom cylinders 18 and likewise the tilt cylinders 20.

Reference is made to the above-identified patent, and particularly the portions thereof referred to describing the hydraulic control valve and its operation, which portions are herein incorporated by reference. Briefly, the control valve will contain several valve sections, each having a valve spool spring biased to a neutral position. One valve spool will control the boom cylinders 18 while another will control tilt cylinders 20. The pedal 32 will be connected to the valve spool controlling the boom cylinders such than when pivoted at the toe, the spool will be shifted from the neutral position in one direction causing the cylinders 18 to lower the boom and when pivoted at the heel, will shift the valve spool in the opposite direction from neutral for extending the cylinders 18 to raise the boom as shown in FIG. 1. Similarly the pedal 30 is connected to another valve spool for extending and retracting the tilt cylinders to pivot the attachment carrier.

As shown in FIG. 2, the pedal 32 for controlling the boom arms 14 is pivotally mounted at 34 to a bracket 35 which is secured to a floor support in the operator's compartment by bolts 36. The outside bolt extends through a slot 37 while the inside bolt goes through a hole to allow the pedal bracket to swivel for a purpose to be described hereinafter. The pedal 30 on the opposite side which controls the attachment carrier is identical to pedal 32 except for being reversed from the left to the right-hand position and the numbers identifying the pedals are the same, but primed. The linkage must transmit linear motion from the boom pedal 32 across the vehicle at some point and then back to the control valve which is mounted toward the rear on the right-hand side. The tilt pedal 30 can be connected more or less directly to the control valve.

Referring to the linkage in FIG. 2, connecting the boom pedal and valve is a first link 38 which is connected to a second link 39 by a bridging link 40. The bridging link 40 has a connection 42 intermediate its ends on a support. A pin and slot arrangment is shown in more detail in FIGS. 6 and 7. A base 44 mounted on the support has a pair of shoulders 45 above which project a pin 43 having flat sides 47 (FIG. 7). The bridging link 40 has a slot 48 with curved sides 49 engageable with the flat sides 47 of the pin. Other structure (not shown) will maintain the slot 48 captive on the pin 43. The base 44 will be secured in any convenient manner to structure below on the vehicle so that the flat sides of the pin are parallel to the crossover path. The pin and slot connection 42 thus forms a rockable, antifriction contact for the bridging link 40 such that it is free to swing or rock in a horizontal plane. The slot 48 and pin 43 are each longer than they are wide in the lateral direction with one having the flat surfaces 47 and the other curved surfaces 49. When moving the valve spool in one direction or the other from neutral, the bridging link will have to swing at one end an amount proportional to the pedal travel which motion is transmitted to the opposite end, and through link 39, to the valve.

The bridging link 40 is connected to the first link 38 by a fixed connection 50 formed by a bolt 51 passing through a hole in the end of link 38 and a tab 52 bent in the end of the bridging link 40 such that the relative angular displacement required by rocking of the bridging link is allowed by flexing of the link 38.

Further in accordance with the invention at various locations of the linkage where a pivotal connection is required, a special pin connector is used. For example, between the second link 39 and the bridging link, there is a connector 60 as shown in more detail in FIGS. 4 and 5. A pair of side connectors 63, 67 on opposite sides of the bar links have pins 62 that pass through holes 65 in the adjacent link ends. The pins are held in place by a spring clip 68 locked in grooves 69 on the pins 62. This is similar to the arrangment of a bicycle chain, however, in the present invention it is important to note that the holes 65 in the ends of the links 39, 40 are larger than the pins 62. It is known, for example, that it is difficult to punch a small diameter hole the thicker the material where the hole is located and at some point, drilling the hole is required. To avoid drilling the flat bar stock, the diameters of the holes 65 are larger than necessary to accommodate the pins 62. For example, if the flat bar stock is seven gauge material, then the holes 65, in order to be conveniently punched, should be larger than this and preferably about one-quarter of an inch in diameter. However, the side connectors 63, 67 can be of much thinner stock than the links 39, 40 because of the lesser strength requirements; and therefore, the holes for the pins 62 are smaller. As a result, the pivotal connector 60 will be assembled with pins 62 tangent to the circumference of the larger holes 65 nearest the joint (FIG. 4) such that pivoting the pedal 32 at the heel swings the bridging link 40 in the direction of arrow A promptly moving the link 39 causing the control valve to raise the lift arms 14. Pivoting the pedal 32 at the toe swings the bridging link 40 in the direction of arrow B pushing the link 39 and thus causing the valve controlling the cylinders 18 to move in the opposite direction from its neutral position lowering the lift arms 14. Any lost motion due to the oversized holes 65 in the links is inconsequential since some slack in the linkage is desirable anyway when operating the pedals.

The pedal 30 is connected to the control valve by a link 70 which like link 38 has a special connection 71 with the pedal and another link at 72. The connection 71 and 72 are like the connection 60 described in FIGS. 4 and 5 and need no further description.

Referring to FIG. 2, the pedals are adjusted by loosening the bolt on the outside which allows the entire bracket to swivel on the inside bolt. Thus the linkage is not adjusted from within. Rather the proper pedal travel is obtained by swiveling the pedal units.

While one preferred embodiment of our invention has been disclosed it will be understood that the description is for purposes of illustration only and that various modifications and changes may be made without departing from the nature of the invention which is defined in the appended claims.

We claim:

1. An improved linkage for transmitting linear motion between a linear motion causing means and a linear motion responsive means, the improvement wherein the motion causing means and the motion responsive means are on spaced paths and linear motion is transmitted along longitudinally and laterally extending paths comprising a first link connected to the motion causing means, a second link connected to the motion responsive means, both on longitudinally spaced paths, a bridging link extending between the two along the laterally extending path, a connection intermediate the ends of the bridging link, said bridging link being made of flat bar stock and said connection comprising a punched opening having curved sides in the lateral direction, a flat sided pin received in said opening engaged with the curved sides of the opening in rolling anti-friction contact, permitting the bridging link to swing between the first and second links, retaining said pin and opening and said links in engagement.

2. The improvement according to claim 1 wherein the pin has a pair of shoulders upon which the bridging link rests.

3. The improvement according to claim 1 wherein the linkage is comprised of individual links, at least some of which are made of flat bar stock, a pivotal connection means permitting relative pivotal movement between adjacent sections, said connection means including a pair of holes, one in each of the adjacent link sections of a diameter greater than the thickness of the material along the axis of the holes, a pair of connection elements of thinner material, one on each side of the link section, having a pair of holes of smaller diameter located over the larger holes, and a pair of pins located in the smaller holes and loosely received in the larger holes whereby the use of machined parts is minimized.

4. The improvement according to claim 3 wherein the linear adjustments between the motion causing and motion responsive means is made at one or the other ends of the linkage by moving the said means.

* * * * *